Sept. 16, 1969  H. S. BEST ET AL  3,467,004
AUTOMATIC SILK SCREENING MACHINE
Filed May 2, 1967  12 Sheets-Sheet 1

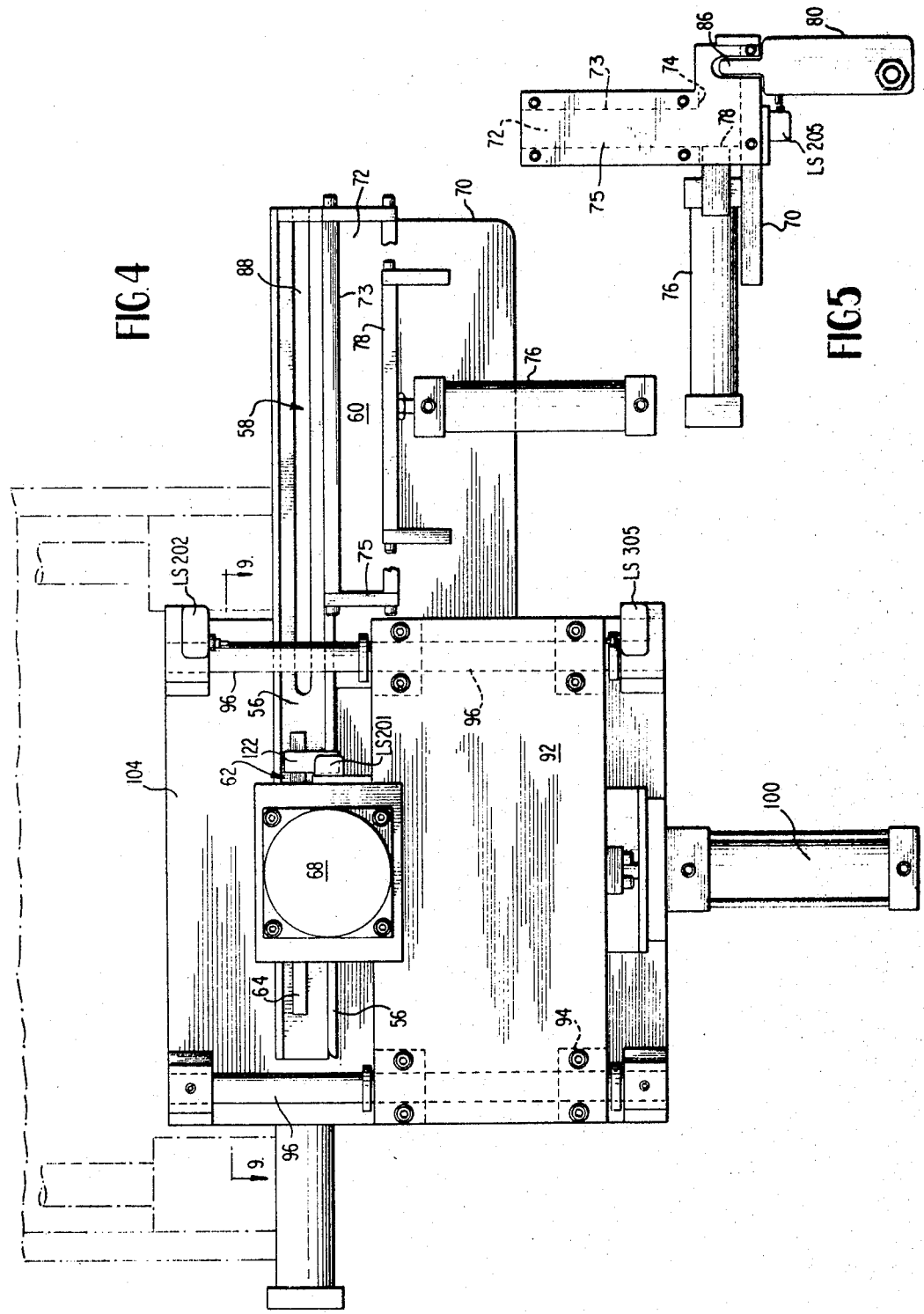

Sept. 16, 1969 H. S. BEST ETAL 3,467,004
AUTOMATIC SILK SCREENING MACHINE
Filed May 2, 1967 12 Sheets-Sheet 3
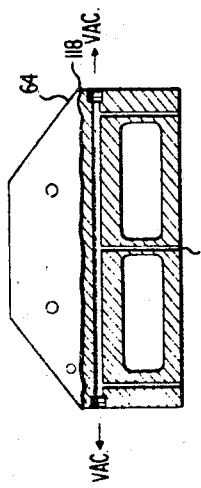
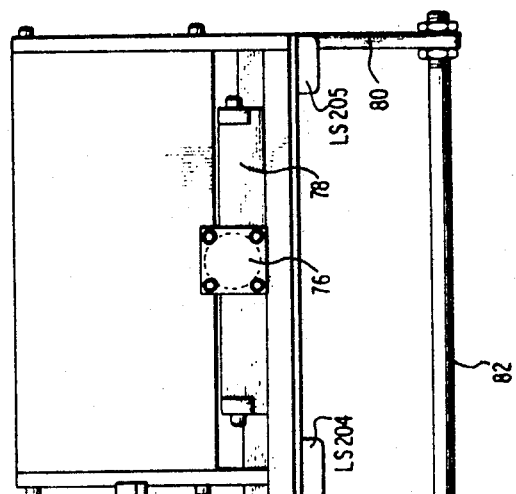
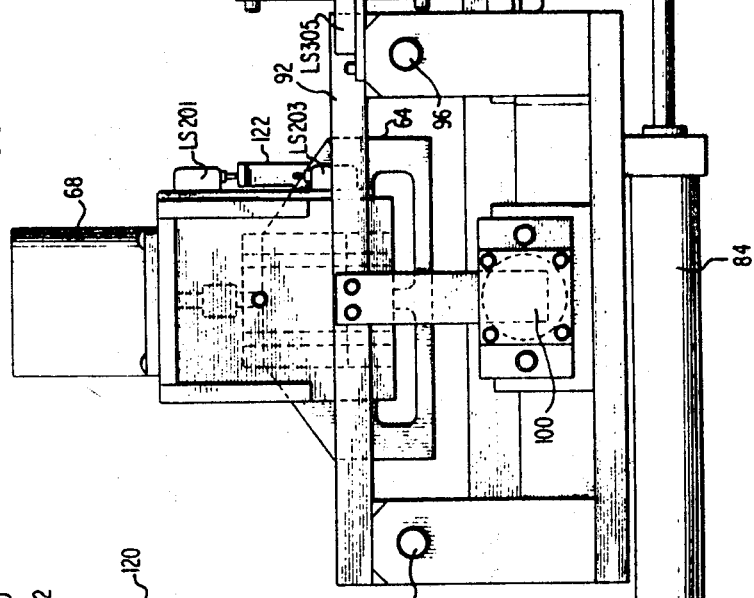
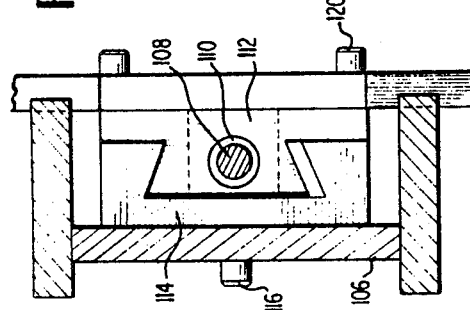

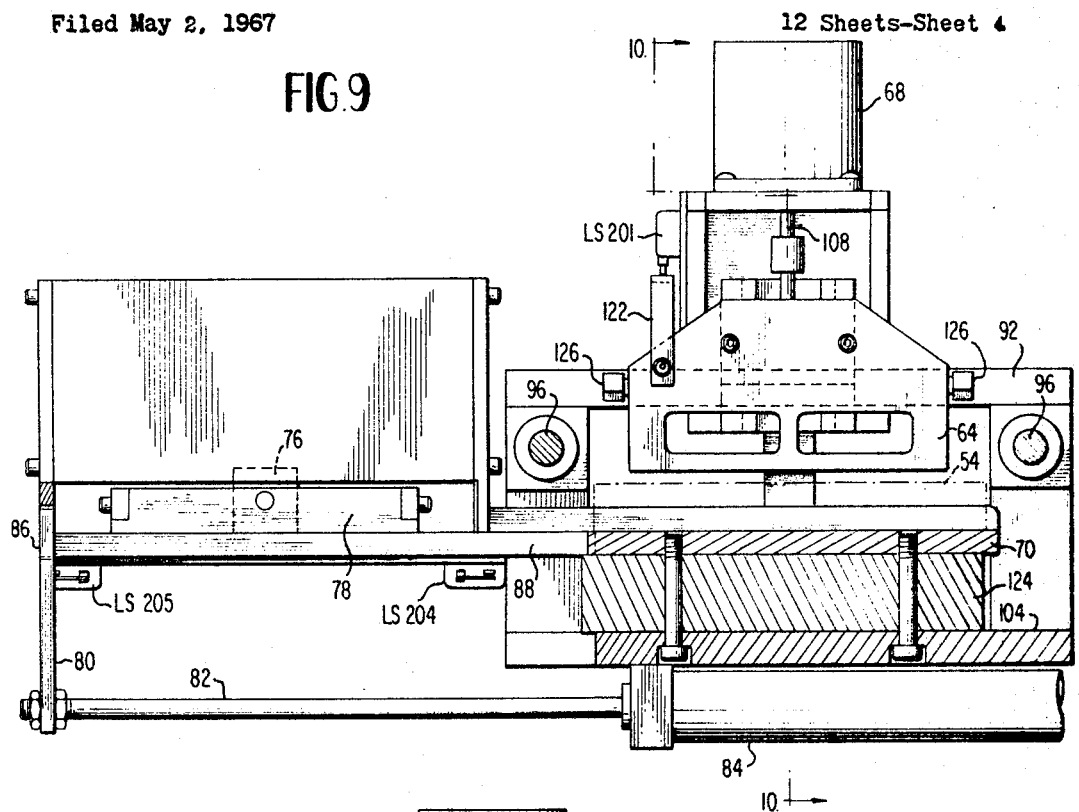

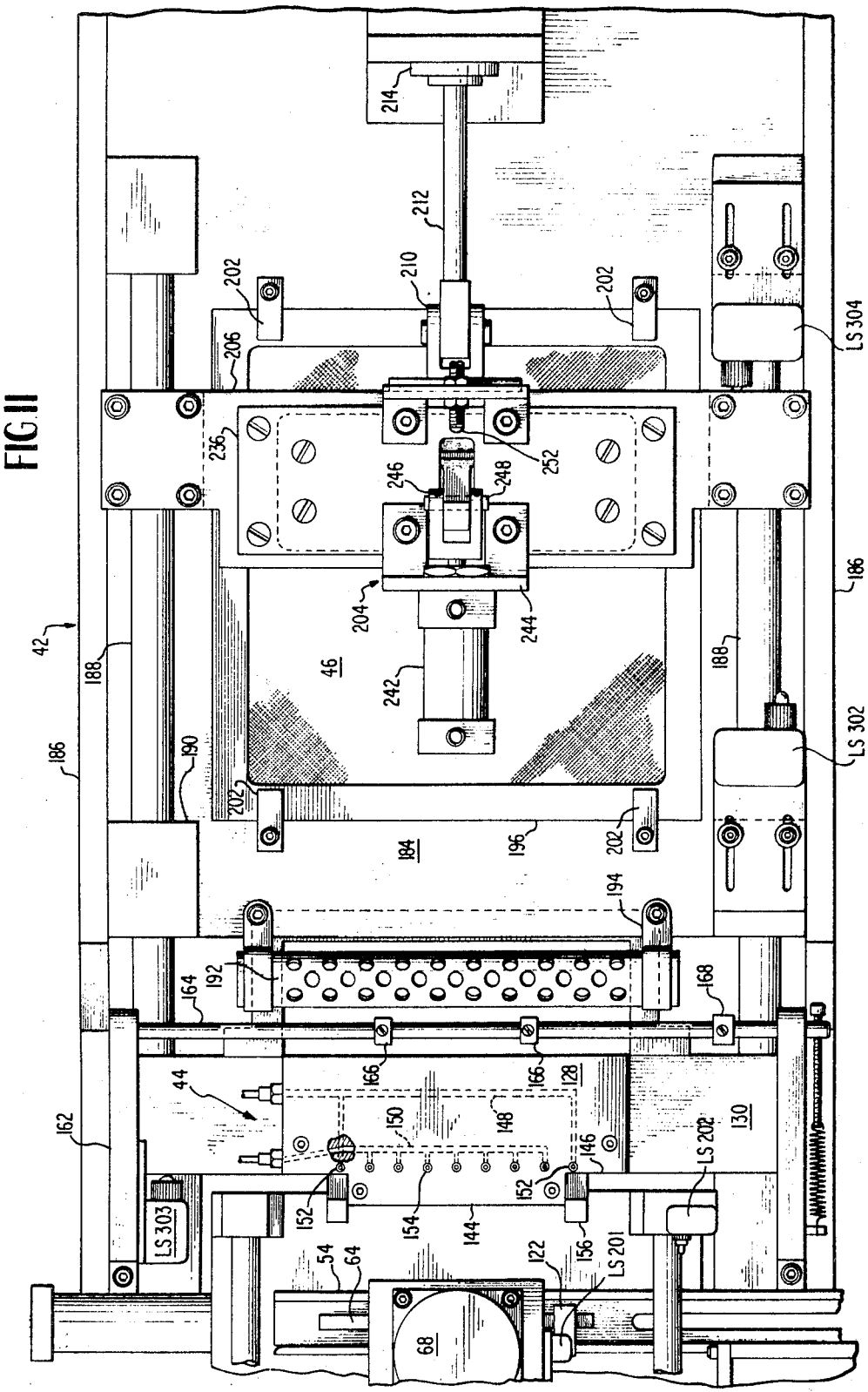

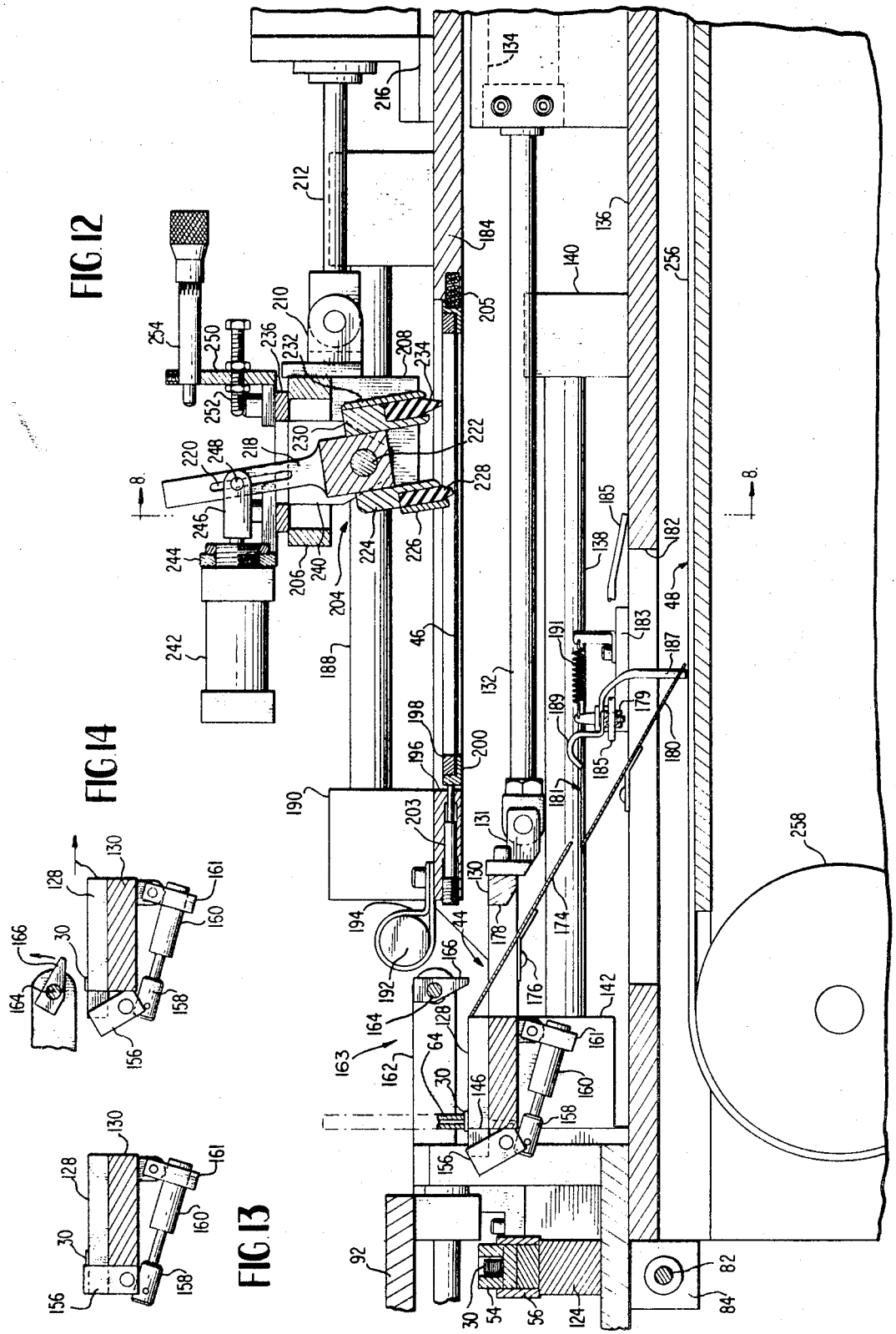

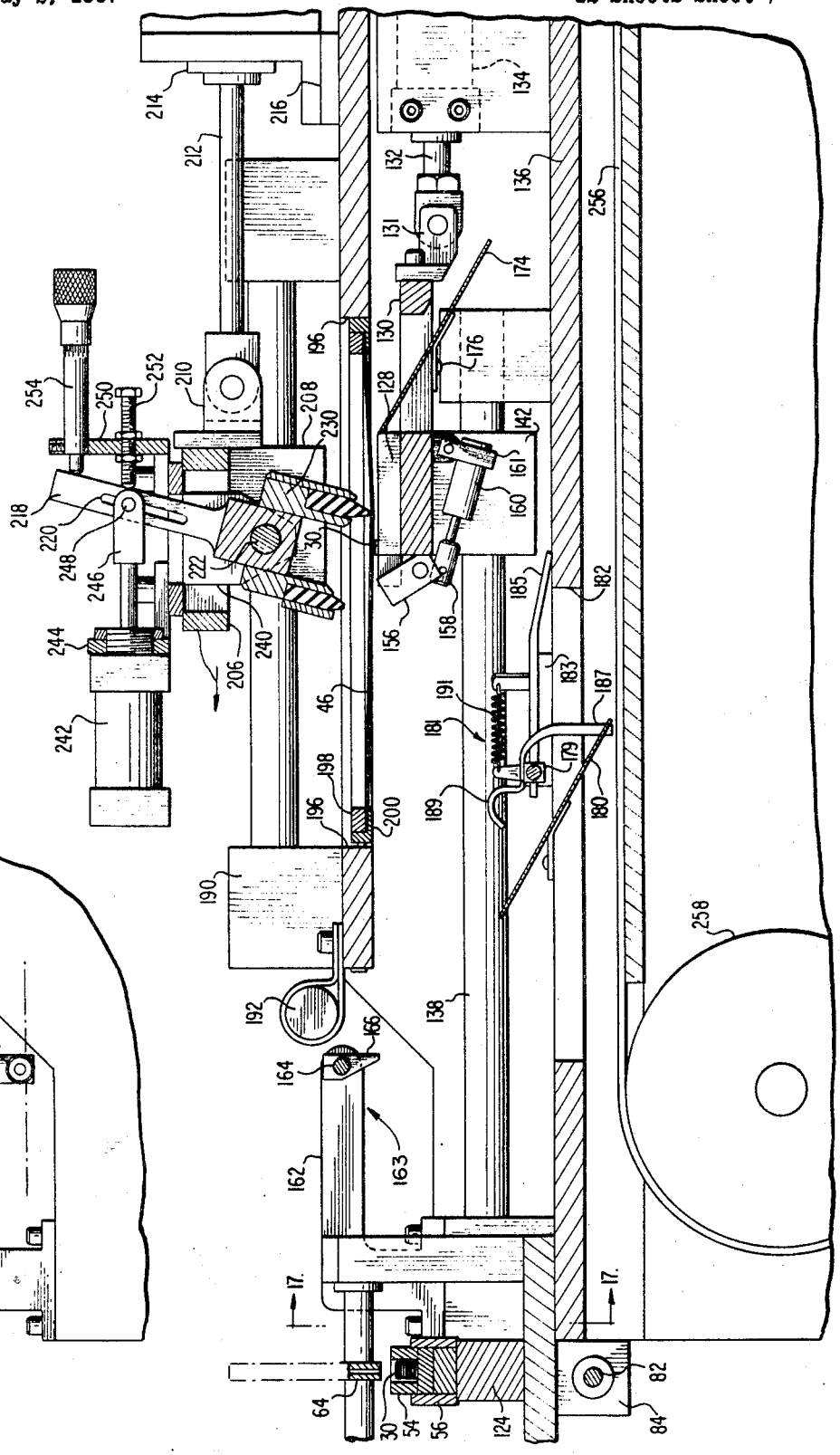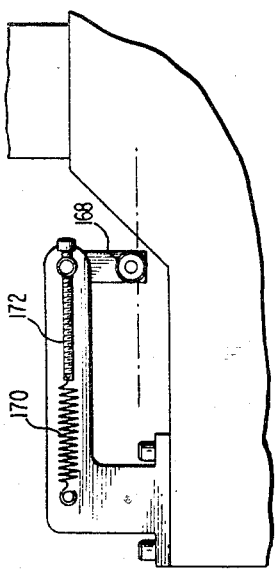

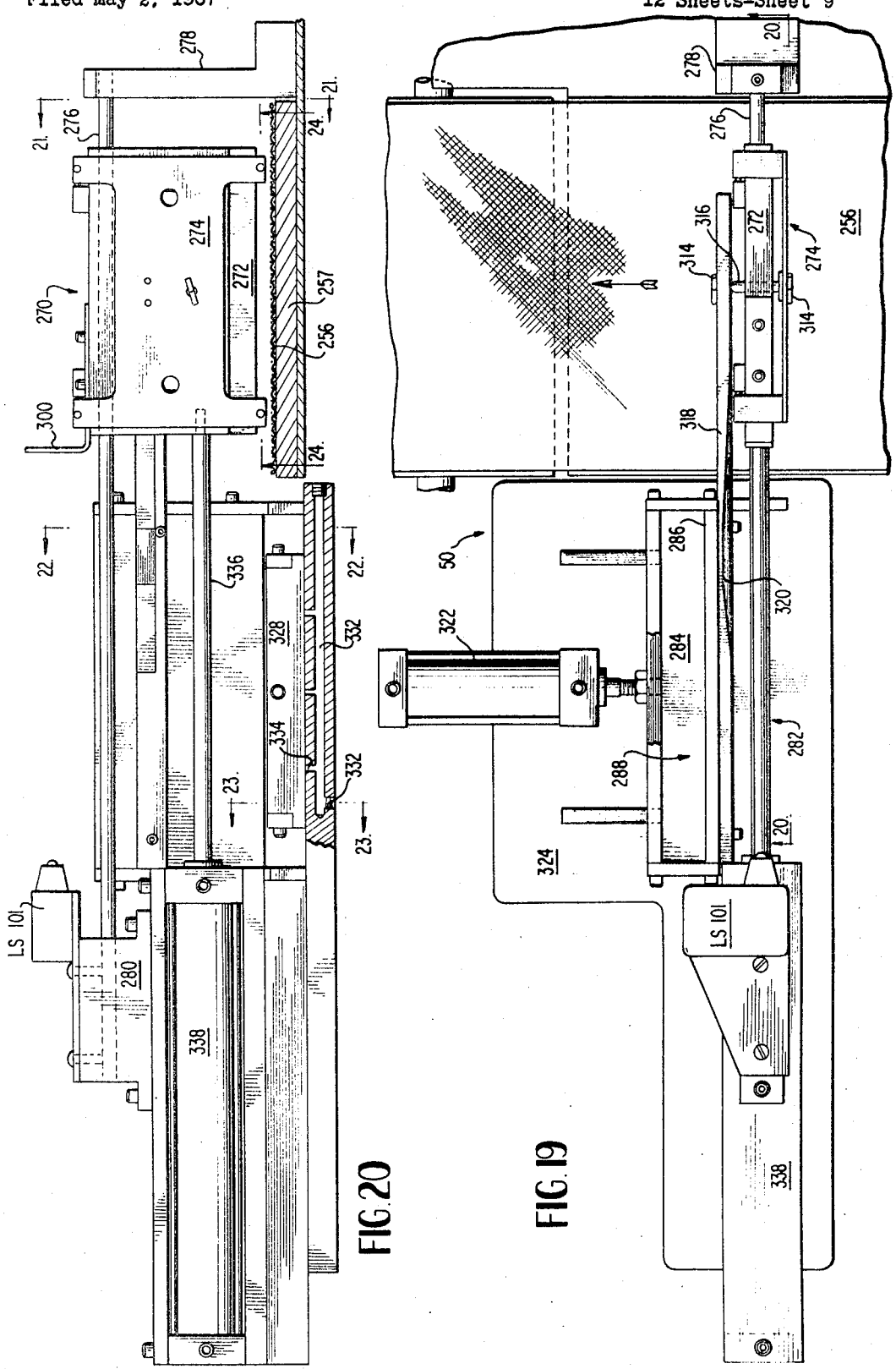

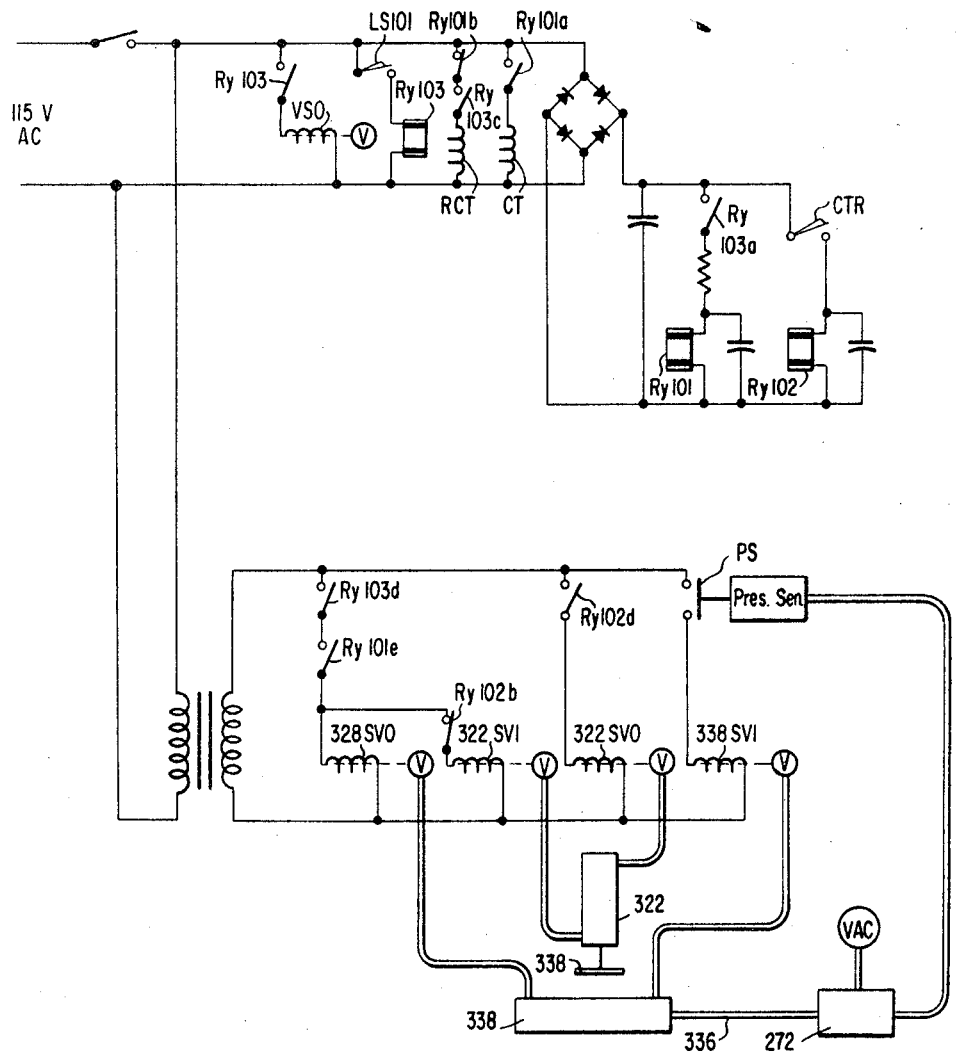

United States Patent Office 3,467,004
Patented Sept. 16, 1969

3,467,004
AUTOMATIC SILK SCREENING MACHINE
Howard S. Best, Horseheads, N.Y., and Paul F. Gibbs and Graham Hartwell Mosely, Raleigh, N.C., assignors to Corning Glass Works, Corning, N.Y., a corporation of New York
Filed May 2, 1967, Ser. No. 635,530
Int. Cl. B41f *17/00;* B41l *27/00*
U.S. Cl. 101—35                        16 Claims

ABSTRACT OF THE DISCLOSURE

An automatic silk screening machine sequentially and automatically picks up, loads, silk screens, dries, and unloads fragile substrates having nonuniform dimensions. The substrates are picked up by a vacuum bar from a rechargeable magazine and then deposited on a reciprocable carriage and aligned by one edge surface. The carriage is reciprocated to a position underneath a silk screen and coating material is forced through the screen by an automatic wiper. On reverse reciprocation of the carriage, the silk screened substrate is scraped off the carriage into a chute and directed to a conveyor which then conveys substrate past a heater for drying and then to a vacuum pick-up unloading station. The picked up substrate is then deposited in a magazine. All operations are automatic and sequentially controlled.

---

This invention relates to an automatic silk screening machine.

In the manufacture of glass ceramic capacitors, a plurality of capacitor electrodes are used. These electrodes are coated by silk screening onto very thin fragile glass strips having nonuniform dimensions. The silk screened strips constituting the capacitor electrodes are then stack assembled and leads placed on them to make a complete capacitor. The known prior art for silk screening the very thin fragile glass strips of nonuniform dimensions was a manual operation.

In attempting to automate this previous manual operation, a number of problems were faced. These problems were caused by the very fragile nature of the special glass used and complicated by the fact that the glass is between one-half and one mil in thickness and is not of any uniform rectangular dimension. In order to automate the silk screening operation, the glass must be handled in a very careful manner and referenced without the aid of a uniform rectangular dimension. The machine of this invention accomplishes these results by gently handling, without breaking, thin fragile glass strips and referencing each strip using one long straight edge of the strip, automatically silk screening the strip and then very gently unloading the coated strip.

The machine of this invention in accomplishing the above, includes an automatic motor with a vacuum pick-up bar which gently picks up glass strips from a magazine one at a time and moves forward to place the strips on a reciprocable silk screen carriage. The glass strip is aligned using one long edge as a reference edge on the carriage and is held on the carriage by vacuum while the carriage moves under a silk screen. A silk screen assembly includes an automatic wiper which forces coating material through the screen onto a desired position on the strip. The carriage is then reciprocated back and the silk screened strip is scraped off the carriage on the return movement and passed through a chute onto a conveyor. The conveyor takes the coated strip over heaters which dry the coating, and then the conveyor passes beneath an unloader station. A vacuum unloader senses each coated strip passing underneath it and picks up and unloads each strip into a magazine after the picked up strip is aligned with the pick-up bar. The unloading magazine is the same construction as the loading magazine and adjacent bins may hold either loaded or unloaded magazines as required. All of the operations are automatic and sequenced utilizing sensors and the fragile glass strips are picked up by vacuum without applying pressure on the stack of strips in the magazine..

The foregoing and other features and advantages of the invention will be apparent from the following detailed description of a preferred embodiment of the invention, as illustrated in the accompanying drawing.

FIGURE 4 is a top plan view of a loading assembly for the silk screening machine.

FIGURE 5 is a side elevation view of one side of the loading assembly.

FIGURE 6 is an end elevation view of the loading assembly as viewed from the outside of the machine.

FIGURE 7 is an elevation view with a portion broken away of a vacuum loading bar of the loading assembly.

FIGURE 8 is a sectional plan view taken along line 8—8 of FIGURE 10.

FIGURE 9 is a sectional elevation view taken along line 9—9 of FIGURE 4.

FIGURE 10 is a longitudinal axial sectional elevation view of the loading assembly taken along line 10—10 of FIGURE 9.

FIGURE 11 is a top plan view of a silk screen assembly of the automatic silk screening machine.

FIGURE 12 is a longitudinal axial sectional view of the silk screen assembly shown in FIGURE 11.

FIGURE 13 is a detail of the longitudinal axial sectional elevation view of FIGURE 11 showing alignment of a substrate strip on a carriage.

FIGURE 14 is a view similar to FIGURE 13 illustrating movement of the carriage and of scaper fingers from the path of the carriage.

FIGURE 15 is an axial sectional elevation view of the silk screen assembly shown in FIGURE 12 illustrating the substrate carriage in the silk screening position.

FIGURE 16 is a detailed side elevation view showing a cam arrangement for the substrate scraper.

FIGURE 19 is a top plan view of an unloader assembly for the automatic silk screening machine.

FIGURE 20 is a transverse sectional elevation view taken along line 20—20 of FIGURE 19.

FIGURE 26 is an electrical circuit diagram of the unloader assembly.

General

Figure 1:
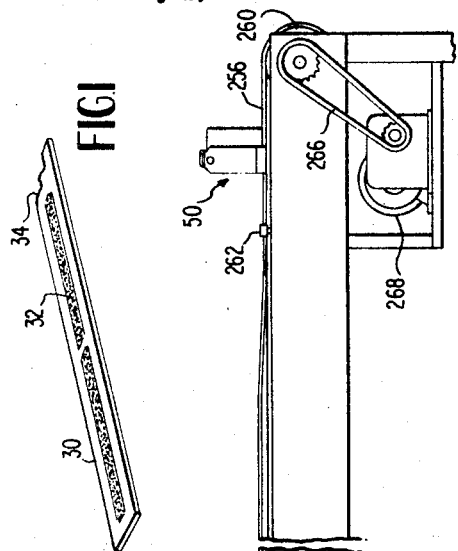
FIGURE 1 is a perspective view of a glass strip after silk screening.

FIGURE 1 shows a substrate 30 in the form of a thin fragile glass strip having nonuniform dimensions on which a silk screen pattern 32 is placed. Where the substrate is to be a capacitor electrode it is a special glass ceramic composition and the pattern 32 which is silk screened thereon is a precious metal paint, for example, gold or silver. A corner 34 is shown broken from the substrate strip to illustratee the nonuniform dimensional problem.

Figure 2:
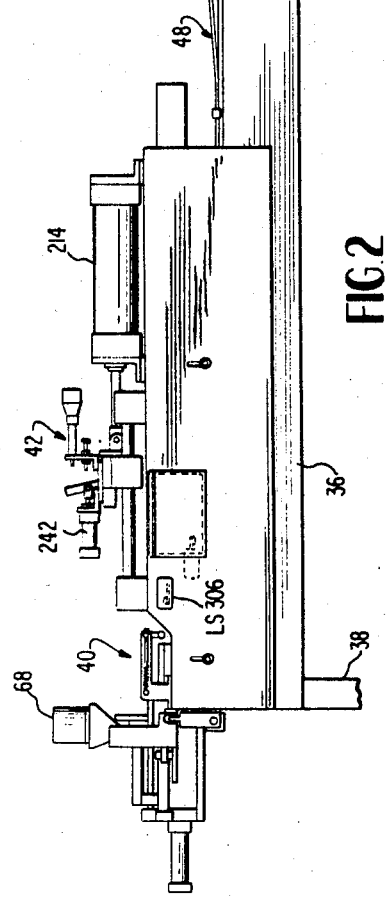
FIGURE 2 is a side elevation view of the automatic silk screen machine of this invention.
Figure 3:
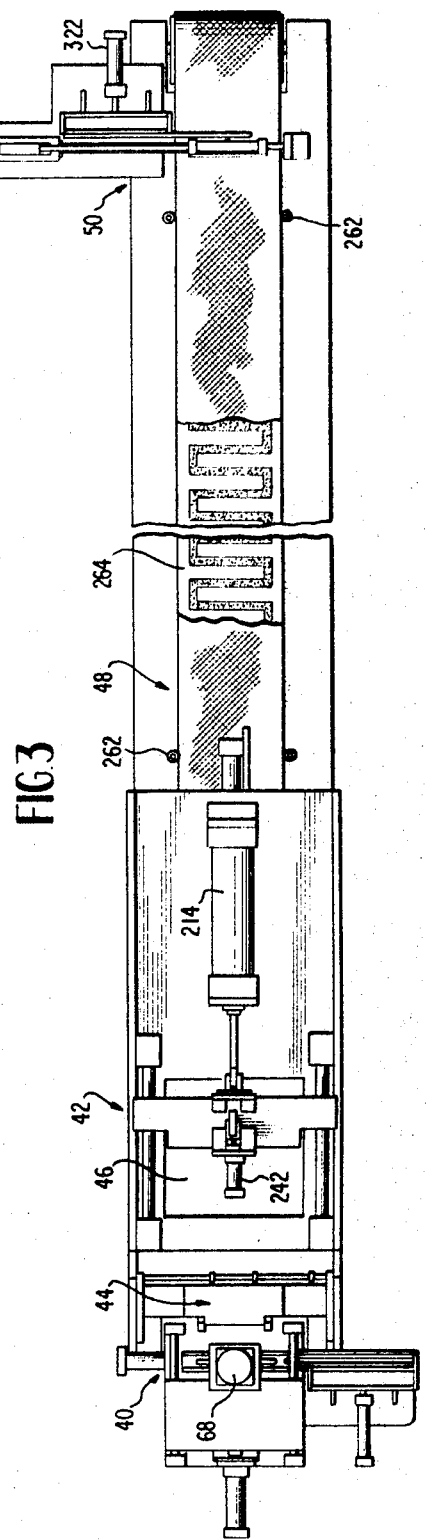
FIGURE 3 is a top plan view of the automatic silk screen machine shown in FIGURE 2.
Figure 17:
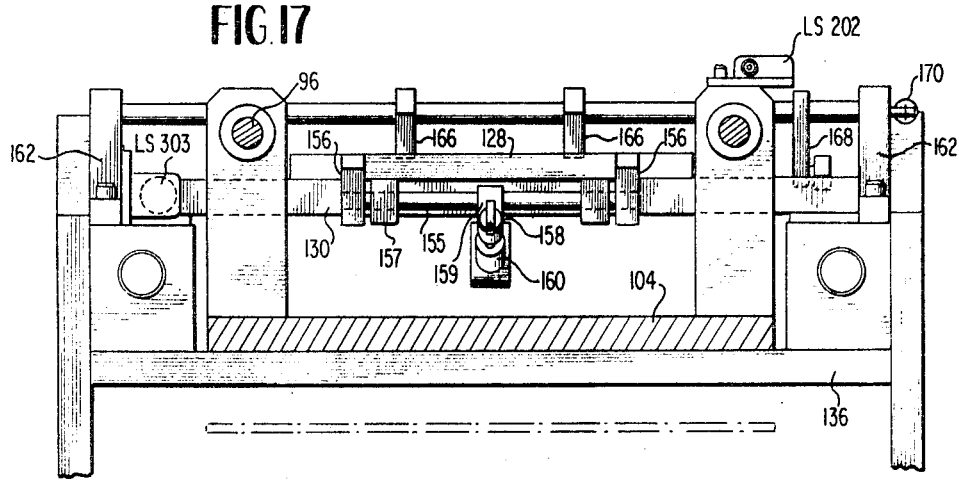
FIGURE 17 is a transverse sectional elevation view taken along line 17—17 of FIGURE 15.

FIGURE 2 is an overall side elevation of the machine and includes an elongated supporting bed 36 supported from the floor by suitable legs 38 and this bed or framework carries the main components of the machine. These main components include a loading assembly 40 which is further illustrated in detail in FIGURES 4–10. A silk screen assembly 42 includes a reciprocating substrate strip carriage assembly 44 which reciprocates from a position underneath a silk screen 46 to a position adjacent the loading assembly 40 and these components are illustrated in more detail in FIGURES 11–18.

A conveyer assembly 48 is carried by the bed 36 and conveys the silk screened strips for drying and to an unloader assembly 50. The unloader assembly is shown in detail in FIGURES 19–22. The fragile glass strips are handled by vacuum pickup in both loading and unloading, are aligned using one long straight edge of the strip and the entire sequence of operations is automatic as will be described in connection with the electrical circuit diagrams of FIGURES 24 and 25.

Loading assembly

The loading assembly 40 is shown in detail in FIGURES 4–10. A magazine 54 for the fragile glass strips 30 is movable along a track 56 from a magazine load station 58 which is adjacent a magazine stack station 60, to a strip pick-up station 62, see FIGURE 4.

At pick-up station 62, a pick-up bar 64 having a vacuum tip 66 is reciprocable vertically under drive from stepping motor 68.

The magazine load station 58 and magazine stack station 60 are on top of support plate 70, and a loaded magazine bin 72 is defined by upstanding side walls 73 and end walls 75, the side walls opening at their bottom 74 see FIG. 5 for the passage of the magazine 54.

A magazine change air motor 76 is supported from plate 70 and has attached to its piston rod a pusher bar 78, see FIGURES 4 and 5. After an empty magazine is returned, the air motor 76 is operated to cause pusher bar 78 to push a loaded magazine of uncoated strips from the bottom of bin 72 into the magazine load station 58, while pushing the empty magazine off onto a receiving chute (not shown).

A magazine charge bar 80, FIGURES 5, 6 and 9, is attached to a piston rod 82 of a magazine charge air cylinder 84. An upper tip 86 on the end of charge bar 80 extends through a slot 88 in plate 70 to engage the end of a magazine 54. Limit switches LS204 and LS205 are positioned beneath the plate 70, as shown in FIGURE 6, to be actuated by the bar 80 to indicate whether the charge bar is in its out position (by LS204) or in its home position (by LS205).

The pick-up bar 64, which is vertically reciprocable by motor 68, is also horizontally reciprocable by virtue of the motor and bar being mounted on a motor carriage 90. This motor carriage includes a table 92 mounted by means of slide bearings 94 to slide on rods 96 from a position above magazine track 56 to a position above the substrate carriage assembly 44 in its home or load position.

Drive for motor carriage 90 is via a depending plate 98 attached to table 92 and to the piston rod of a motor carriage drive motor 100 which in turn is mounted by bracket 102 on a plate 104.

Reciprocation of motor carriage 100 is controlled by limit switch LS202 for the forward position of the motor carriage and limit LS305 for the home position of the motor carriage.

The motor 68 is mounted atop of bracket 106 which bracket in turn is affixed to the table 92. A motor drive shaft 108 extends vertically downward through the top of the bracket and has a screw configuration 110 on its lower end. This drive shaft screw engages a threaded dovetail slide 112, see FIGURE 8. The slide 112 is slidable in a fixed slide 114 which is fixed to the bracket 106 by screws 116. The pick-up bar 64 is rigidly secured to the movable slide 112 by suitable screws 120. By this construction the pick up bar moves in a true rigidly guided vertical direction when motor 68 rotates shaft 108 due to the screw and nut drive and slide guides.

The pick-up bar 64 has vacuum applied to its lower tip 66 by vacuum passages 118 as shown in FIGURE 7. Vacuum connections 126 are screwed into these passages.

Up and down movement of the pick-up bar 64 is sequentially controlled by means of switch arm 122 attached to the pick-up bar and cooperating with LS201 in the up position of the pick-up bar and LS203 in the extreme down and empty magazine position of the pick-up bar. Control of downward movement of the bar when the magazine is not empty is accomplished by vacuum sensing means in fluid communication with passage 66 and as described hereinafter.

When switch LS201 is operated, the pick-up bar is up and the motor carriage 90 may move in or to the right as shown by the arrow in FIGURE 10. When the switch LS203 is operated, the pick-up bar 64 has emptied all of the strips 30 from the magazine 54 and is at the bottom of the magazine showing that the magazine is empty. This starts the automatic sequence to operate the magazine change motor 76.

Since the plate 70 and magazine track 56 are vertically above plate 104, a spacer block 124 may be positioned therebetween.

Silk screen assembly

The silk screen assembly 42 including reciprocating substrate or strip carriage 44 and the silk screen 46 is best shown in FIGURES 11–18.

The strip or substrate carriage assembly 44 includes a table top 128 mounted on a carriage body 130, see FIGURES 11 and 12. The carriage body 130 is connected by yoke 131 to a piston rod 132 of a pneumatic motor 134. The motor 134 is mounted via bracket 135 on support plate 136.

Guide rods 138 supported by posts 140 guide the carriage assembly 44 for reciprocating movement by means of slide bearings 142 attached to carriage body 130 engaging the rods 138.

As shown in FIGURES 11 and 12, the table top 128 includes a front surface 144 and with an indented pair of aligning edges 146. Vacuum passageways 148 and 150 are formed within top 128 and terminate in holes 152 and 154, respectively. Holes 152 are for sensing (to sense if the deposited strip is long enough to cover the spaced apart holes). If so, the silk screening may proceed. Holes 154 are for vacuum holding of the substrate or glass kept on the top 128. The vacuum applied to line 150 appearing at holes 154 is initially a low vacuum but on movement of the carriage away from its home position toward the silk screen position, a high vacuum is applied to better hold the substrate in position for the silk screening operation.

For the purposes of aligning the glass substrate on top of table 128 an alignment arrangement is provided, as shown in FIGURES 12–14. This alignment arrangement includes a pair of aligning blades 156 fixed to shaft 155, FIGURE 17, which is journaled by bearings 157 extending from the carriage. A piston rod 158 of an alignment motor 160 is attached to a member 159 so as to rotate shaft 155 and oscillate the alignment blades 156. The alignment motor 160 is carried by pivoted bracket 161 secured to the bottom of carriage member 30. On applying air to motor 160, the piston rod 158 and motor 160 are spread apart causing pivotal movement of blades 156 until they abut the vertical aligning edge 146 of table top 128, as shown in FIGURE 13. As shown in FIGURE 12, the home position of the carriage 44 and the load position of the motor carriage having pick-up bar 64 is such that the glass strip 30 is deposited to slightly overlap the aligning edge 146 so that when the aligning blades 156 are pivoted, they may push the strip into alignment using one long edge of the strip and the edge 146 of the table.

After the strip is aligned and held by vacuum on the top of table 128, the carriage 44 is reciprocated to the right, as viewed in FIGURE 12, to a position for silk screening, as in FIGURE 15. After silk screening, the carriage 44 is reciprocated back to its home position, at which time a raking means 163 rakes the substrate off the top of table 128. During the forward movement of the carriage 42, the raking means 163 is positioned out of the way. The raking means 163 includes vertical side supports 162 carrying a shaft 164, see FIGURE 11, which extends across the path of the machine. The shaft 164 has a pair of raking fingers 166 rigidly attached thereto. The ends of the raking fingers extend down to the level of the table top 128. A cam member 168, see FIGURES 11 and 16, is provided at one end of the rod to contact carriage member 130 on forward reciprocation of carriage 44 to pivot the raking fingers 166 out of the way, as shown in FIGURE 14.

Figure 18:
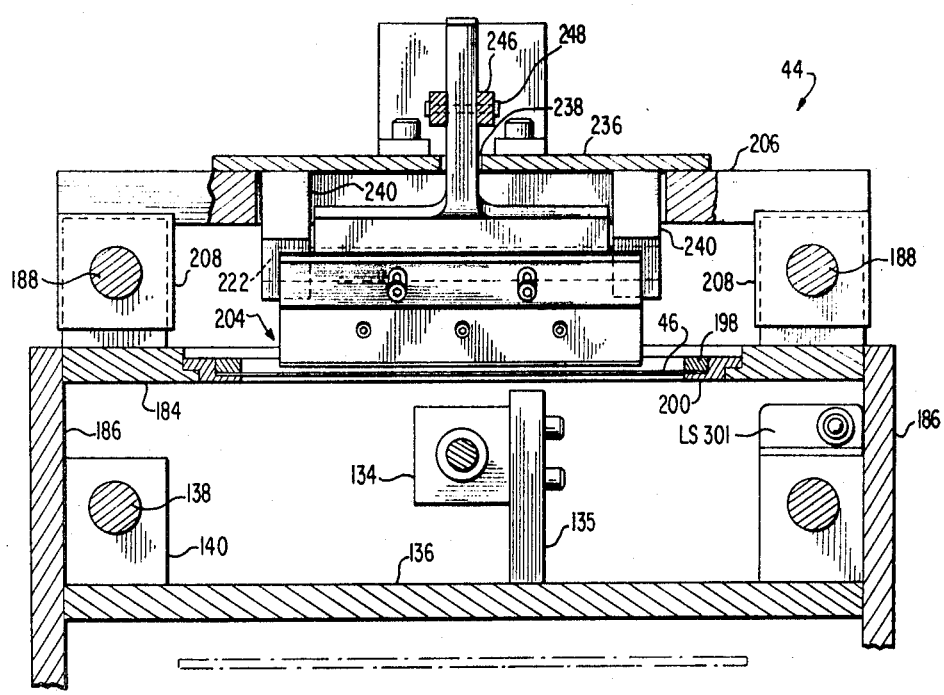
FIGURE 18 is a transverse sectional elevation view taken along line 18—18 of FIGURE 12.

A spring 170, an adjustment screw 172, see FIGURES 11 and 16, are provided to normally bias the raking fingers 166 to a raking position. However, as shown in FIGURE 16, on forward reciprocation of carriage 44, the path of the carriage member 130 will contact cam 168 and pivot fingers 166 to the position shown in FIGURE 14. On reverse reciprocation of carriage 44, the forward edge of raking fingers 166 will rest on the top of the table and will rake the coated substrates off. LS301, FIGURE 18, is positioned to be operated when carriage 44 is in forward or silk screening position and LS303, FIGURE 11, is positioned to be operated when the carriage is in its home or loading position.

For removing the silk screened glass strip substrate from carriage table top 128, a removal assembly includes the raking fingers 166 as described above and a slide 174 attached by bracket 176 to the carriage member 130 and extending through a hole 178 therein. The strip as raked off the top of the table passes downwardly by gravity on the slide and passes off of slide 174 onto a slide extension 180 extending through hole 182 in plate 136. The coated or silk screened glass strips are aligned by a gate 181 at the lower end of slide 180 so that they are substantially transverse to the movement of belt assembly 48 when they are dropped thereon. This gate includes a shaft 179 pivotably mounted in side supports 183. The shaft includes a stop 185 bearing on top of plate 136. Gate fingers 187 extend downward below slide extension 180 to stop a strip and allow it to align itself by gravity against the fingers so that the strip extends transverse to the belt. When the carriage 44 moves toward coating position the bottom of the carriage contacts cam lever 189 to pivot shaft 179 and fingers 187 move up to allow the strip to drop on conveyor belt 256 with the length of the strip perpendicular to the travel of the belt. Spring 191 biases the gate to strip stopping position.

The silk screener 42 includes a support plate 184 extending between upstanding side walls 186. Guide rods 188 carried by posts 190 are provided along the edges of plate 184.

An anti-static assembly 192 is mounted in brackets 194 at the forward end of plate 184.

An opening 196 in plate 184 is for the silk screen 46. The silk screen includes a two component frame with an inner member or frame top 198 and a lower frame bottom 200. The frame bottom is Z-shaped in section along the edges, as shown in FIGURE 18, to support the inner frame within the opening 196. The silk screen 46 is held between the two frame members as shown. Pivotable tabs 202, FIGURE 11, are provided on the top of plate 184 to hold the screen assembly and frame in reference position. Screws 203 in the front of the frame are used to adjust the frame position against the bias of spring 205.

A wiper carriage assembly 204 includes a carriage crossplate 206 having slide bearings 208 mounted to slide in a reciprocal manner along rods 188. A yoke 210 attached to the rear end of plate 206 is also connected to a piston rod 212 of wiper carriage drive motor 214. This motor in turn is mounted in support bracket 216. Limit switches LS302 and LS304 are positioned as shown in FIGURE 11 to be operated by the carriage plate 206 and indicate whether the wiper carriage is in its forward or home position, respectively.

The wiper carriage assembly 204 carries a rockably mounted wiper arm 218 having a slot 220 in its upper end and its wiper arm is rockably mounted on pivot rod 222. A spreading wiper holder 224 is secured to one bottom face of arm 218 and bit and plate 226 sandwich therebetween a spreading wiper 228. On the other side of wiper arm 218 is a screening wiper holder 230 and plate 232 which sandwich therebetween a screening wiper 234.

Mounted on top of plate 206 is a plate 236 having a longitudinal slot 238 therein for the movement of the upper end of wiper 218, see FIGURES 12 and 18. Depending from plate 236 are supports 240 for the pivot rod 222.

A wiper pivot motor 242 is mounted by means of support bracket 244 to the top of plate 236. A yoke 246 is attached to the piston rod of motor 242 and a cross rod 248 extends through the slot 220 in the upper end of wiper arm 218. Extension of the piston rod of motor 242 pivots the wiper arm from the position shown in FIGURE 12 to the position shown in FIGURE 15.

Control of the extent of movement of the wiper arm 218 is by means of an adjustable stop 252 threaded in a bracket 250 which in turn is secured to plate 236. Setting of the adjustable stop may be accomplished by micrometer 254 also attached to bracket 250. The micrometer 254 is used to set the end of stop 252 and is then backed off so that the micrometer itself does not take the shocks of repetitive operation.

As is usual in squeegees or wipers for silk screening operations, one movement of the wiper assembly is to distribute the coating material while the other movement of the wiper assembly is to spread the coating material back for the next coating wipe. For this reason, the spreading squeegee 228 is different shaped and is not pressed down as much on the surface of silk screen 46 as is wiper 234 which applies the coating. FIGURE 15 shows the wiper 234 applying the coating through the silk screen 46 and it is noted that the silk screen is pushed down to the level of the top of strip 30, which strip is normally slightly below the bottom of the silk screen 46.

Conveyer assembly

The conveyor assembly is shown in FIGURES 1, 2, 12 and 20, and includes a mesh conveyer belt 256 movable over a belt support 257 at least on its upper run, and trained in an endless fashion around a front idler 258 and a rear drive wheel 260. Side guides 262, FIGURES 1 and 2, may be provided for guiding the upper run of the conveyer in a straight line. Heating of the coated strips for drying the coating during movement from the silk screening to the unloading loader assembly is accomplished by a thermostat controlled resistance heater 264.

Drive of the conveyer belt is by means of a belt and pulley drive 266 from a motor transmission unit 268, see FIGURE 1.

Unloader assembly

The unloader assembly is best shown in FIGURES 19–24 and it includes an unloader pick-up assembly 270. The unloader pick-up assembly in turn includes an unloader pick-up bar 272 and a strip alignment mechanism 274. The unloader pick-up assembly 270 is mounted for movement transverse of the conveyor on a rod 276 which in turn is mounted at one end on a post 278 and at the other end in a support 280.

An unload station 282, FIGURE 19, is positioned adjacent the conveyor under the rod 276. A bin space 284 is adjacent the unload station 282 and is defined by upright walls 286 which provide an empty magazine station 288.

Figure 24:
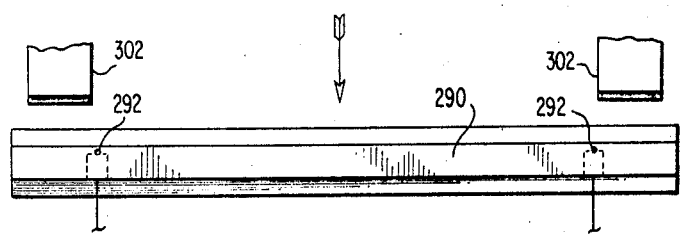
FIGURE 24 is a bottom plan view looking along line 24—24 of FIGURE 20.

The unloader pick-up bar 272 has a bottom surface 290 with a pair of vacuum holes 292 connected to a source of vacuum. Referring to FIGURE 24, when a strip is advancing in the direction of the arrow by means of the conveyor assembly 48, and is uneven, one end of the strip will be picked up by one of the vacuum pick-up holes 292 and the strip in effect will pivot about its support from the bottom 290 of the bar until the other end of the strip is picked up by the other vacuum holes 292. When both vacuum holes 292 are blocked, a vacuum switch is actuated to cause the bar to lift vertically. Fittings 296 are provided for the lines leading to vacuum holes 292.

A switch actuating bracket 300 is attached to the top of pick-up bar 272 by screws 301 and extends upwardly so as to actuate LS101 when the unloader pick-up assembly is at the unload station 282.

The alignment mechanism 274 includes alignment feet 302 secured to the bottom end of a plate 304. The top of the plate 304 is secured to arms 306 which in turn are pivotally attached to a plate 308 secured by screws 310 to the back of the pick-up bar 272. The alignment mechanism can pivot from the position shown in FIGURE 21 for pick up to the position shown in FIGURE 22 for alignment. A spring 312 extends through the pick-up bar 272 and is attached to pins 314 on the back side of bar 272 and the front side of plate 304. This spring biases the alignment feet 302 to the position shown in FIGURE 22.

Figure 21:
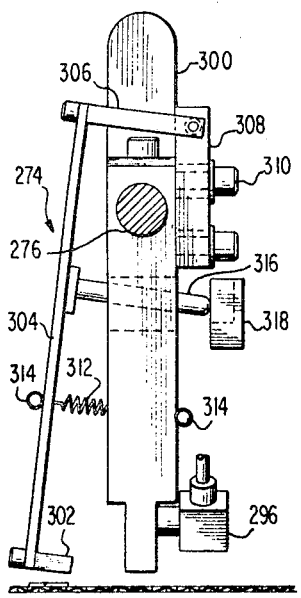
FIGURE 21 is a sectional view taken along line 21—21 of FIGURE 20.
Figure 22:
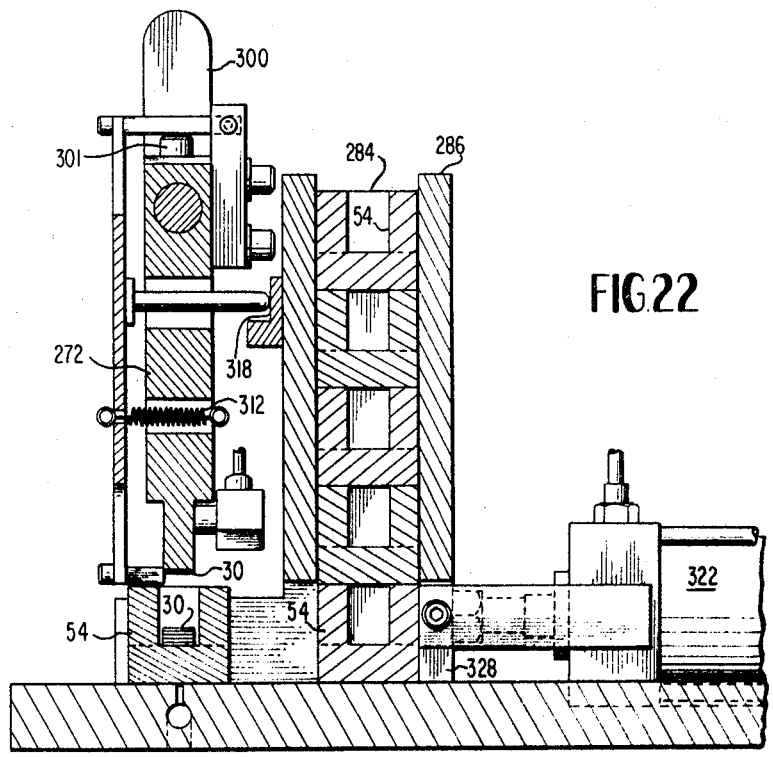
FIGURE 22 is a sectional elevation view taken along line 22—22 of FIGURE 20.

Control of the position of the alignment feet 302 is from a stationary linear cam 318 cooperating with cam follower pin 316, which pin is secured to the rear side of plate 304, see FIGURES 21 and 22. The cam 318 has an indented portion 320 as shown in FIGURE 19 to allow the alignment feet 302 to tap one edge of glass strip 30 until that edge is parallel with the bottom edge of bar 272. This occurs as the bar 272 moves to the left, as viewed in FIGURES 19 and 20 to the unload station 282.

Figure 23:
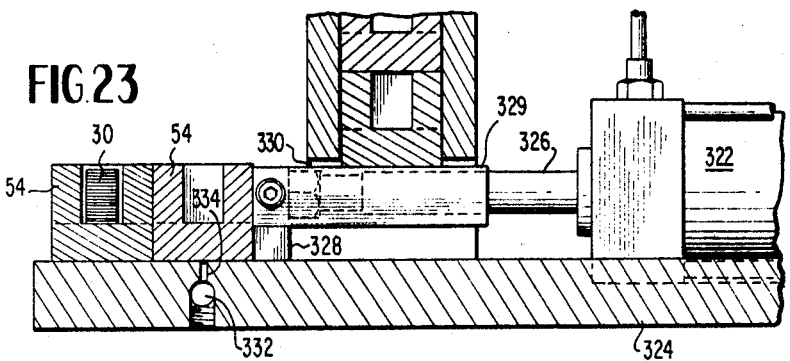
FIGURE 23 is a fragmentary sectional elevation view taken along line 23—23 of FIGURE 20.

After one magazine 54 is filled, it is replaced under the control of magazine replacement motor 322 supported from stationary plate 324. The motor has a piston rod 326 attached at its outer end to a pusher 328. As shown in FIGURES 22 and 23, the pusher reciprocates beneath the bottom of bin space 284 to push the lowermost empty magazine 54 to the left, as viewed in FIGURES 22 and 23. This magazine is pushed out and replaces a full magazine as illustrated in FIGURE 23, while holding arms 329 hold the next higher magazine 54 as the pusher reciprocates under the terminated side walls 330 of the bin.

A vacuum passage 332 terminating in openings 334 lead to underneath the bottom of magazine 54 in the unload station 282. This vacuum holds the magazine in place.

For reciprocating the unloader pick-up assembly 270 transversely of the conveyor, a rod 336 is attached to the side of the unloader pick-up bar 272 and this rod is the piston rod of an unloader bar shifting motor 338 which is supported above plate 324.

Operation and electrical system

Figure 25:
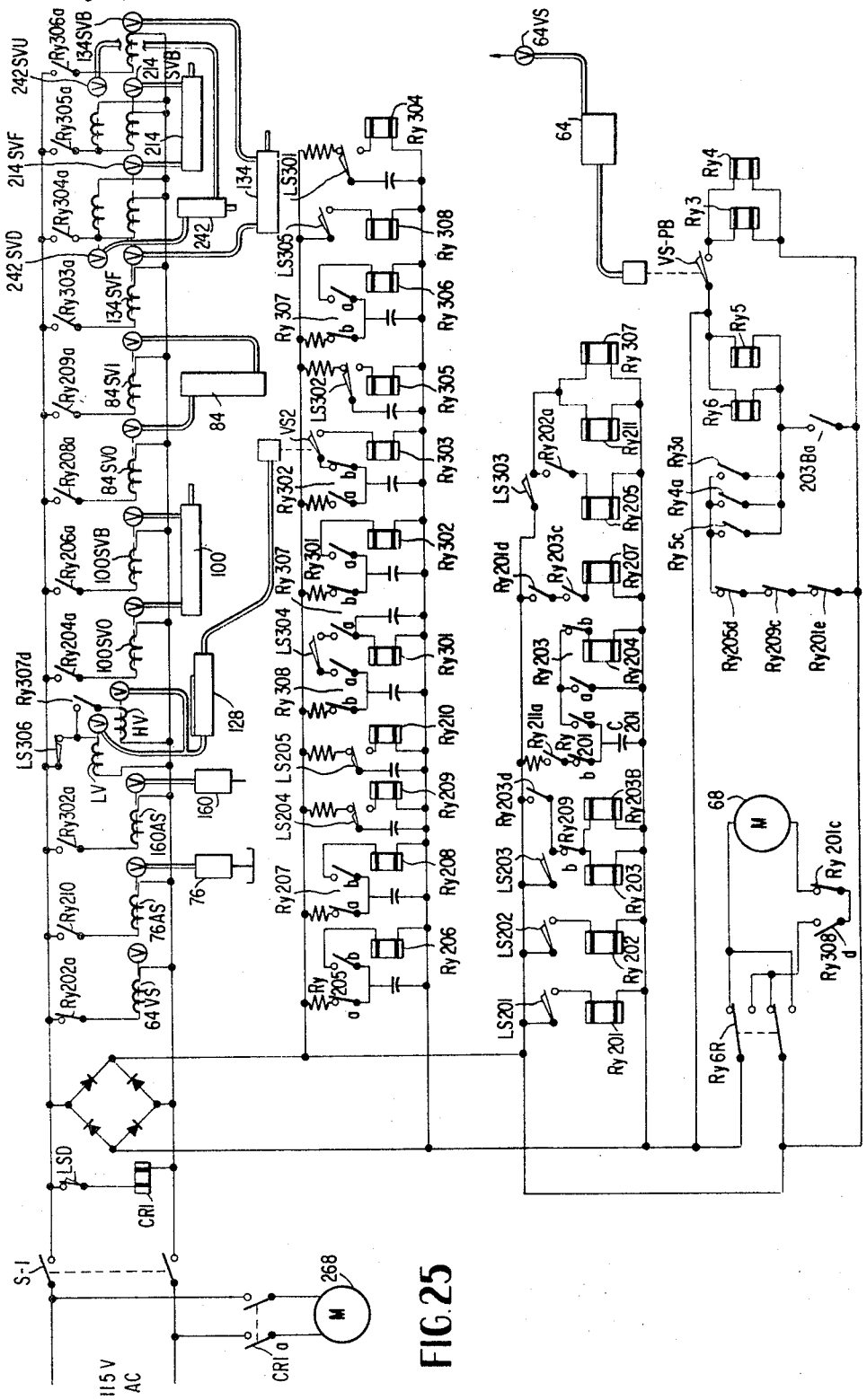
FIGURE 25 is an electrical circuit diagram of the loading assembly and silk screen assembly.

It is believed that the operation of the mechanical components in general is self-explanatory but the correlation and sequencing of the mechanical operations with the electrical components as explained with the electrical system in FIGURES 25 and 26 will now be detailed.

Referring to FIGURE 25, closing of main power switch S1 will apply the power through reversing switch Ry6R and through then closed contacts Ry308d, then closed Ry201c and Ry6c all closed to cause the motor 68 to drive pick-up bar 64 downward. Because the motor carriage is out of its forward position, LS202 will not energize Ry202 and contacts Ry202a will energize solenoid valve 64VS applying vacuum to the pick-up bar 64. When the bar is about .040 inch from the top glass strip, vacuum will pick up the strip closing the openings 66. The increase in vacuum to the pick-up bar is sensed by vacuum switch VS–PB which closes energizing relays Ry3 and Ry4. Energization of Ry3 and Ry4 causes closing of contacts Ry3a and Ry4a to cause energization of Ry5 and Ry6. Ry5 and Ry6 are self-locking through contacts Ry5c. Ry6 controls the reversing switch Ry6R for motor 68 to cause the motor to reverse direction and move the pick-up bar 64 with the substrate held by vacuum to the lower surface thereof upward. At the upper limit of movement of motor 68, LS201 is operated which in turn energizes Ry201 which opens contacts Ry201c turning off motor 68 and unlatches motor direction control relay Ry6, and also pulses Ry204 if Ry203 is not energized and if Ry211 has charged C201 and operates Ry207 if Ry203 is energized. Pulsing of Ry204 closes contacts Ry204a energizing solenoid valve 100SVO sending the motor carriage 90 forward under the control of motor 100.

At the extreme forward position of carriage 90, LS202 is operated energizing relay Ry202 which, when energized, opens contacts Ry202a releasing vacuum from the pick-up bar, and operates Ry205 if LS302 is closed, as it will be when the wiper is forward. Ry206 is pulsed by the closing of contacts Ry205a and b. Energization of Ry206 closes contacts Ry206a energizing 100SVB applying air to the other end of motor 100 and sending the motor carriage back to its home position. In home position of carriage 90, LS305 is closed which energizes Ry308 turning the motor power on through contacts Ry308d closing.

When there are no more glass strips in magazine 54, LS203 is operated by the limit of travel motor 68 in a downward direction. Closing LS203 operates Ry203 and Ry203B if Ry209 is not energized. Ry203 and Ry203B themselves through contacts Ry203d. Ry203 latches out Ry204 and energizes Ry207 if Ry201 is energized.

Closing of contacts Ry203Ba operates Ry6 which reverses motor 68 through reversing switch Ry6R sending the pick-up bar 64 up.

LS201 is closed when the pick-up bar 64 reaches its uppermost position operating Ry201 which in turn operates Ry207 because Ry203 is energized. Ry207 pulses Ry208 through contacts Ry207ab and Ry208 sends the magazine charge bar 78 to its out position by applying power through contacts 208a to 84SVO applying air to one end of motor 84. LS204 is operated in the out position of the charge bar and when it is closed, relay 209 is pulsed, relay 209 in turn unlatches Ry203 by opening contacts 209b which in turn also unlatch Ry6 and sends the magazine change bar to its home position by closing contacts Ry209a, energizing 84SVI and applying air to the other end of motor 84.

LS205 is closed when the magazine change bar 84 reaches its home position which in turn pulses Ry210, closing contacts Ry210a, applying power to solenoid valve 76AS which drives air to cylinder 76 causing pusher bar 78 to move a new magazine into position.

The operation of the silk screening assembly 42 in connection with carriage 44 and carriage 90 can best be seen from FIGURES 11–18 taken in connection with FIGURE 25. As motor carriage 90 reaches its home position, it closes LS305 energizing relay Ry308 which closes contacts Ry308d and applies power to motor 68. Ry308 will also cause pulsing of Ry301 through contacts Ry308a if the wiper is in its home position, at which time LS304 is closed and if the carriage 42 is in its home position, at which time LS303 was closed operating Ry307 closing contacts Ry307a.

Ry301 is operated when LS304 is closed (the wiper carriage is in home position) and Ry307 and Ry308 are operated. Ry301 operates Ry302 through contacts Ry301a. Ry302 operates to close contacts Ry302a applying power to solenoid valve 160AS which applies air to the glass registration cylinder. At that time Ry303 is operated if VS2 is closed as it will be with the substrate blocking the holes 152 in table 128. Energization of Ry303 closes contacts Ry303a causing solenoid valve 134 SVF to apply air to one end of motor 134 moving glass carriage 46 to its forward position. LS303 is deactivated when the glass carriage leaves its home position and in this condition is closed to operate Ry307 closing contacts Ry307d and energizing the solenoid HV to apply high vacuum to the vacuum holes in plate 128.

When Ry304, by LS301, contacts 304a cause movement of the wiper to the forward position and the applicator to the downward position by closing appropriate solenoid valves 214SVD and 214SVF applying air to motors 214 and 242. LS302 which is operated when the wiper reaches its forward position operates Ry305 closing contacts Ry305a which in turn reverse the motors 214 and 242.

In return of the glass carriage 44 to its home position, LS306 is operated which turns off all vacuum, de-energizes solenoids LV and HV so that there is no vacuum applied to the table top 128 during the portion of the travel needed to remove the substrate by the scraper from the carriage. LS303 is operated when the carriage 44 reaches its home position, LS303 operates Ry307 and Ry211. Ry307 pulses Ry306 which in turn through contacts 306a and 134SVB causes motor 134 to send the carriage back to its home position.

Belt drive motor 268 is controlled by relay CR1 closing contacts CR1a. Switch LSD is a limit switch operated by the opening of the side door of the housing and its position is shown in FIGURE 2.

The unloader's operation can then be understood with reference to FIGURES 19–24 and FIGURE 26. The pick-up bar 272 is in the position shown in FIGURES 19 and 20 over belt 256 as the belt is moving in the direction of the arrow in FIGURE 19 and strips are moving to a position under the pick-up bar. Vacuum is applied to the pick-up bar and as one edge of the moving strip comes under hole 292, vacuum picks up that edge of the strip and causes the bar to in effect pivot around the closed vacuum hole 292 until the other vacuum hole 292 picks up the other end of the strip. At that time, a vacuum is pulled and a pressure sensing switch PS is closed to apply the power 338SVI and air solenoid valve leading to motor 338 which is connected to bar 272 by rod 336 which in turn causes the bar to move to the left as viewed in FIGURES 19 and 20 to the unloading station 282.

On reaching the unloading station, switch operating bracket 300 closes LS101 energizing relay Ry301 closing contacts Ry301d shutting off the vacuum by solenoid valve VSO. Vacuum being shut off to pick up bar 272 the glass strip will drop from the bar into the magazine beneath the bar at the position shown in FIGURE 22. Contacts Ry301a step counter coil CT. Contacts Ry303a allow relay Ry101 to pulse closing Ry101a stepping counter coil CT opening contacts Ry101b. Contacts Ry103d and 101e are closed energizing 338SVO solenoid applying air to the other end of motor 338 and driving the pick-up bar 272 back to its position above the conveyer.

After a predetermined number of strips have been counted and collected, the predetermined counter switch CTR closes energizing Ry302. Energization of Ry302 closes contacts Ry302d applying power to solenoid valve 322SVO and causing air motor 322 and bar 338 to push an empty magaizne into station 282. Bar 338 is retracted on the next cycle when Ry101 and 103 are energized but Ry102 is not, thus 322SVI applies air to motor 322 to pull the bar 338 back. The counter is reset by coil RCT energized when Ry103 is energized and Ry101 is not, that is, when a predetermined counter switch CTR is closed.

What is claimed is:

1. A machine for automatically silk screening a pattern onto a fragile substrate, the machine comprising:
   (a) a support,
   (b) a loading assembly on the support including a vertically reciprocable lifter bar with vacuum applied thereto, the lifter bar supported by a horizontally movable base for picking up one substrate at a time from the top of a pile of substrates without applying force to any but the top substrate in the pile and for automatically moving the picked up substrate from the pile and placing it onto a silk screen substrate carriage,
   (c) a silk screen assembly adjacent the loading assembly on the support and including the silk screen substrate carriage, the carriage being mounted for reciprocal movement from a position adjacent the loader assembly to a position under a silk screen,
   (d) a wiper assembly carried by the silk screen assembly and movable over the silk screen,
   (e) means for removing a silk screened substrate from the carriage after silk screening and while the carriage reciprocates to its position adjacent the loading assembly,
   (f) an elongated conveyer assembly on the support having a portion thereof below the silk screen assembly for receiving a silk screened substrate removed from the silk screen substrate carriage, and
   (g) an intermittently operable unloader assembly adjacent another portion of the conveyor including means for sensing the presence of a silk screen substrate on the conveyor and a vacuum lift bar for removing the silk screened substrate from the conveyer by force of vacuum and transporting it from the conveyor.

2. A machine as in claim 1 further comprising means carried by the silk screen substrate carriage for aligning an edge of the substrate on the carriage with reference to an edge surface of the carriage.

3. A machine as defined in claim 2 further comprising vacuum means for sensing the presence of a substrate on the silk screen substrate carriage.

4. A machine as defined in claim 3 further comprising high vacuum application means carried by the silk screen substrate carriage actuatable on sensing the presence of a substrate on the carriage and on movement of the carriage toward a position under the silk screen.

5. A machine as in claim 1 wherein the wiper assembly includes a pair of parallel positioned, rockably mounted wipers, one for forcing coating materials through the silk screen and the other for flooding the silk screen, and means for rocking the wipers and reciprocating the wipers across the silk screen sequenced with movement of the silk screen substrate carriage.

6. A machine as defined in claim 5 further comprising motor and control means reciprocating the wiper assembly simultaneously with rocking of the rockable mounted wipers.

7. A machine as defined in claim 1 wherein the conveyer assembly includes a drying means comprising a heater for heating the silk screen substrate as it is carried by the conveyer.

8. A machine as in claim 7 wherein the conveyer is an endless conveyer of a woven material and the heater is a strip heater positioned adjacent the conveyer.

9. A machine as in claim 1 wherein the removing means includes raking fingers and further comprising a movable gate to align strips transverse to the conveyer.

10. A machine as defined in claim 9 further comprising magazine change means including motor means for changing full and empty magazines at the unloading and loading assemblies, respectively.

11. A machine as in claim 1 where the substrates are picked up from a portable trough-like magazine and formed into a stack of substrates in a portable trough-like magazine of the same configuration.

12. A machine as in claim 11 wherein the loading assembly includes a magazine exchange means for supplying a full magazine to the loading assembly adjacent the substrate lift on detecting of an empty magazine.

13. A machine as in claim 1 further comprising sequential controls for automatic operation in sequence of the loading assembly, substrate carriage, and silk screen assembly.

14. A machine as in claim 1 further comprising limit switch means for releasing vacuum to the vacuum lift when the lift has moved over an unloading station.

15. A method of silk screening a pattern onto a thin fragile glass strip, the method comprising; picking up one thin fragile glass strip at a time by vacuum, aligning the picked up strip using one edge thereof as a reference, transporting the aligned strip to a silk screening zone while holding the fragile glass strip by vacuum, silk screening a pattern onto the glass strip, removing the strip from the silk screening zone, automatically transporting the strip through a heating zone, and sensing the presence of the strip and removing the strip by vacuum after the strip has been transported through the heating zone.

16. A method as in claim 15 further comprising detecting the presence or absence of a strip on the carriage, and in the absence of a strip stopping the silk screening step.

References Cited

UNITED STATES PATENTS

| | | | |
|---|---|---|---|
| 2,209,688 | 7/1940 | Davis | 101—124 |
| 2,833,426 | 5/1958 | Bosken | 214—6 |
| 3,031,706 | 5/1962 | Holman | 214—6 X |
| 3,202,302 | 8/1965 | Insolio | 214—6 |
| 3,215,071 | 11/1965 | Stillwell | 101—114 X |

FOREIGN PATENTS 717,447    10/1954    Great Britain.

ROBERT E. PULFREY, Primary Examiner

C. D. CROWDER, Assistant Examiner

U.S. Cl. X.R.

101—123, 126, 129; 214—6, 8.5